United States Patent Office 3,470,220
Patented Sept. 30, 1969

3,470,220
GERMANIUM AND TIN COMPOUNDS
Kurt Moedritzer, Webster Grove, and John R. Van Wazer, Ladue, Mo., assignors to Monsanto Company, St. Louis, Mo., a corporation of Delaware
No Drawing. Filed Aug. 19, 1965, Ser. No. 481,090
Int. Cl. C07f 7/22, 7/00
U.S. Cl. 260—429  22 Claims

ABSTRACT OF THE DISCLOSURE

The present invention relates to germanium and tin containing compounds having the general formula:

$$R_{4-n}MX_{n-m}Y_m$$

in which R is selected from the group consisting of hydrocarbyl radicals having from 1 to 20 carbon atoms, such as saturated and unsaturated alkyl and cycloalkyl radicals having from 1 to 20 carbon atoms, and phenyl and substituted phenyl radicals having from 6 to 20 carbon atoms; M is a metal selected from the group consisting of germanium and tin; and X and Y are different members selected from the group consisting of a halogen such as fluorine, chlorine, bromine and iodine as well as alkoxyl, thioalkyl, dialkylamino, cyano, cyanate, thiocyanate, azide and acetylide radicals; $n$ is a whole number from 2 to 4, and $m$ is a whole number from 1 to 3, with the requirement that $m$ be less than $n$.

The compositions of the present invention have utility as functional fluids, dielectric materials, biological compounds and plasticizers.

The present invention relates to novel organometallic compounds which contain germanium or tin, and also to processes for the preparation of such compounds.

According to the invention, there are provided new and valuable germanium or tin containing compounds having the general formula:

$$R_{4-n}MX_{n-m}Y_m$$

in which R is selected from the group consisting of hydrocarbyl radicals having from 1 to 20 carbon atoms, such as saturated and unsaturated alkyl and cycloalkyl radicals having from 1 to 20 carbon atoms, and phenyl and substituted phenyl radicals having from 6 to 20 carbon atoms; M is a metal selected from the group consisting of germanium and tin; and X and Y, are different members selected from the group consisting of a halogen such as fluorine, chlorine, bromine and iodine as well as alkoxyl, thioalkyl, dialkylamino, cyano, cyanate, thiocyanate, azide and acetylide radicals; $n$ is a whole number from 2 to 4, and $m$ is a whole number from 1 to 3, with the requirement that $m$ be less than $n$. For example, when $n$ is 4, $m$ is 3, and X is fluorine and Y is dimethylamino the product is $$MF[N(CH_3)_2]_3$$

having a molecular weight of 223.8 when M is germanium and a molecular weight of 269.9 when M is tin.

The compounds of the present invention may be grouped into several categories, based upon the general formula $R_{4-n}MX_{n-m}Y_m$ set forth above.

(A) $n=4$: $MX_{4-m}Y_m$, $m=1, 2$ or $3$
(B) $n=3$: $RMX_{3-m}Y_m$, $m=1$ or $2$
(C) $n=2$: $R_2MXY$

Specific examples within these categories are shown below:

(A) $GeF_2Cl_2$, $GeFI_3$, $GeBr_3(OR)$, $Ge(OR)_2(SR)_2$, $Ge(CN)_3(NR_2)$, $Ge(CNO)_2(CNS)_2$, $GeCl_2(C\!:\!CF)_2$, $GeCl_3N_3$, $SnF(OR)_3$ $SnBrCl_3$, $Sn(OR)Cl_3$, $SnCN(SR)_3$, $Sn(CNO)Cl_3$, $Sn(C\!:\!CR)(N_3)_3$.

(B) $RGeFCl_2$, $RGeBr_2Cl$, $RGeI(OR)_2$, $RGeCl_2(OR)$, $RGe(SR)_2I$, $RGe(CN)_2F$, $RGe(CNO)_2Br$, $RGe(CNS)(OR)_2$, $RGe(C\!:\!CR)Cl_2$, $RGe(N_3)_2Br$, $RSnFCl_2$, $RSnBrCl_2$, $RSnBrI_2$, $RSn(OR)(NR_2)_2$, $RSn(CN)F_2$, $RSn(CNO)_2Cl$, $RSn(CNS)Br_2$, $RSn(C\!:\!CR)_2Br$, $RSnCl_2(N_3)$.

(C) $RR'GeClBr$, $RR'GeBrI$, $RR'GeFBr$, $RR'Ge(OR)Cl$, $RR'Ge(NR_2)(SR)$, $RR'Ge(CN)F$, $RR'Ge(CNO)Cl$, $RR'Ge(C\!:\!CR)Cl$, $RR'GeF(N_3)$, $RR'SnClBr$, $RR'SnClI$, $RR'SnCl(OR)$, $RR'Sn(NR_2)(OR)$, $RR'Sn(CN)Cl$, $RR'Sn(CNO)Br$, $RR'Sn(N_3)Cl$, $RR'Sn(C\!:\!CR)Cl$, where R and R' may be alike or different and are selected from the group consisting of hydrocarbyl radicals having from 1–20 carbon atoms.

The general method of preparation of the novel germanium or tin compounds, $R_{4-n}MX_{n-m}Y_m$ utilizes pairs of compounds of the general formula $R_{4-n}MX_n$ and $R_{4-n}MY_n$ (with the meanings of R, M, X, Y and $n$ as described above) which are reacted in the respective mole proportions of 1:0.05 to 1:50, or preferably 1:0.2 to 1:5. A specific range of proportions to yield any desired compound is approximately stoichiometric, as shown below, although the broader ranges are helpful in carrying the reaction to completion with respect to any specific starting material.

| Category | Major product | Prepared from— |
|---|---|---|
| $n$-4 | $MX_3Y$ | $3MX_4 + MY_4$ |
|  | $MX_2Y_2$ | $MX_4 + MY_4$ |
|  | $MXY_3$ | $MX_4 + 3MY_4$ |
| $n$-3 | $RMX_2Y$ | $2RMX_3 + RMY_3$ |
|  | $RMXY_2$ | $RMX_3 + 2RMY_3$ |
| $n$-2 | $R_2MXY$ | $R_2MX_2 + R_2MY_2$ |

The mixture of the two components undergoes reaction at a temperature from −20° C. to 300° C., a preferred range being from 25° C. to 150° C. The compounds that result exist as variously mixed substituted species of the general formula $R_{4-n}MX_{n-m}Y_m$ appearing in various proportions depending on the mole proportions of the reactants. As an example methyltrichlorogermane is reacted with methyl trimethylmercaptogermane in the mole proportion 1:2 to obtain the products, methyldichloromethylmercaptogermane and methyldimethylmercapto chlorogermane in the mol proportion of 1:2. As another specific example fluorotris(dimethylamino)germane is obtained by heating and mixing together tetrafluorogermane with tetrakis(dimethylamino)germane at a temperature of about 100° C. in a pressure vessel.

Separation of the mixed products from the reaction mixture is carried out by conventional means such as chromotography, countercurrent extraction in a solvent, or distillation. However, the mixtures of variously substituted compounds which are obtained may often be used in the form of mixtures for certain industrial applications.

The preparative reaction is preferably conducted in a closed vessel, although the use of relatively high boiling starting materials, e.g., a boiling point of at least 100° C. for the germane or tin material, permits the use of an open vessel.

While the germanium and tin components described above react without a catalyst, it has been found that Lewis acid type catalysts provide a faster reaction to obtain the present products. For example, aluminum chloride, boron trifluoride, zinc dichloride, ferric tribromide and antimony pentachloride are representative catalysts which are useful in the present process.

The aforesaid reactants are preferably sealed into a reaction vessel autoclave or reaction tubes using an inert atmosphere such as nitrogen or helium gas. The reaction vessels are then maintained at a temperature in the range of from −20° C. to 300° C., for example at 100° C. for a period of time of from 1 hour to 200 hours, with the higher temperatures providing a shorter reaction time. If desired a solvent such as an aromatic hydrocarbon such as benzene, an aliphatic hydrocarbon such as hexane, or an oxygen or halogen containing solvent such as ether or carbon tetrachloride may be employed, although a solvent is not essential. The products of the present invention have good stability.

The following examples illustrate specific embodiments of the present invention.

EXAMPLE 1

The preparation of the mixed methylmercapto and chlorine group containing methylgermanium compounds is shown in the present example. A pressure tube is charged with 0.01 mol of methyltrichlorogermane together with 0.01 of a mol of methyltris(methylmercapto) germane. The tube containing this mixture is sealed under nitrogen, and is then heated in a tube furnace at about 120° C. Other tubes are similarly charged with the ratios of the reactants as shown in the table below. The progress of the reaction is followed by withdrawing the tube from the furnace from time to time and measuring the presence of the desired mixed compound reaction products having the formulae $CH_3GeCl_2(SCH_3)$ and $$CH_3GeCl(SCH_3)_2$$

by proton nuclear magnetic resonance. The table below shows the relationship of the two components in the products.

DISTRIBUTION (MOL PERCENT) OF MIXED CHLORNIE METHYLMERCAPTOMETHYLGERMANES

| Mol ratio (reactants) $CH_3GeCl_3$ to $CH_3Ge(SCH_3)_3$ | Mol percent | |
|---|---|---|
| | $CH_3GeCl_2(SCH_3)$ | $CH_3GeCl(SCH_3)_2$ |
| 1:3 | 12.2 | 87.8 |
| 1:1.5 | 31.9 | 68.1 |
| 1:0.88 | 57.6 | 42.4 |
| 1:0.44 | 85.8 | 14.2 |
| 1:0.2 | 96.4 | 3.6 |

In order to separate the desired compounds from the reaction mixture, separation procedures such as chromatographic absorption and distillation are employed. Distillation is preferably carried out under vacuum conditions. For example, the compound $CH_3GeCl_2(SCH_3)$ has a boiling point of approximately 57° C. at 25 mm. pressure, while the compound $CH_3GeCl(SCH_3)_2$ shown above has a boiling point of 88° C. at 25 mm. pressure. Separation of the two compounds is readily carried out by distillation.

Identification of the molecular characterization of the compositions of the present example is conducted by the following procedure. The compound $CH_3GeCl_2(SCH_3)$ is identified by the proton nuclear magnetic resonance spectrum with two peaks of equal area at −2.367 and −1.483 p.p.m. The compound $CH_3GeCl(SCH_3)_2$ gives proton nuclear magnetic resonance at −2.250 and −1.242 p.p.m. in the calculated ratio of 2:1 for methyl groups on sulfur versus methyl groups on germanium.

EXAMPLE 2

When the procedure of Example 1 is used with 10 millimoles of germanium tetrachloride and 3.3 millimoles of germanium tetrafluoride as the reactants in 100 milliliters of hexane as the solvent, with reaction being conducted at 50° C., the major product is germanium trichlorofluoride, with less than 5 mol percent of any other compounds being present. This product is characterized by NMR analysis as having a $F^{19}$ chemical shift of +24.4 p.p.m. relative to trifluoroacetic acid.

EXAMPLE 3

When the procedure of Example 1 is used with 5 millimoles of germanium tetrachloride and 5 millimoles of germanium tetrafluoride as the reactants in 10 milliliters of hexane as the solvent, with reaction being conducted at 60° C., the major product is germanium dichlorodifluoride, with less than 5 mol percent of other compounds being present. This product is characterized by NMR analysis as having a $F^{19}$ chemical shift of +39.7 p.p.m. relative to trifluoroacetic acid.

EXAMPLE 4

When the procedure of Example 1 is used with 3 millimoles of germanium tetrachloride and 9 millimoles of germanium tetrafluoride as the reactants in 100 milliliters of hexane as the solvent, with reaction being conducted at 75° C., the major product is germanium chlorotrifluoride, with less than 5 mol percent of other compounds being present.

EXAMPLE 5

When the procedure of Example 1 is used with 9 millimoles of germanium tetrachloride and 3 millimoles of tetrakisdimethylaminogermane as the reactants in 10 milliliters of chloroform as the solvent, with reaction being conducted at 25° C., the major product is dimethylaminotrichlorogermane (at least 95 mol percent). This product is characterized by NMR analysis as having a proton NMR chemical shift of −2.77 p.p.m. relative to tetramethylsilane.

EXAMPLE 6

When the procedure of Example 1 is used with 5 millimoles of germanium tetrachloride and 5 millimoles of tetrakisdimethylaminogermane as the reactants in 25 milliliters of chloroform as the solvent, with reaction being conducted at 50° C., the major product is bisdimethylaminodichlorogermane (at least 95 mol percent). This product is characterized by NMR analysis as having a proton NMR shift of −2.67 p.p.m. relative to tetramethylsilane.

EXAMPLE 7

When the procedure of Example 1 is used with 3 millimoles of germanium tetrachloride and 9 millimoles of tetrakisdimethylaminogermane as the reactants in 25 milliliters of chloroform in the solvent, with reaction being conducted at 50° C., the major product is trisdimethylaminochlorogermane (at least 95 mol percent). This product is characterized by NMR analysis as having a proton NMR shift of −2.62 p.p.m. relative to tetramethylsilane.

EXAMPLE 8

When the procedure of Example 1 is used with 3 millimoles of tin tetrachloride and 2 millimoles of tetrakisdimethylaminotin as the reactants in 10 milliliters of pentane as the solvent, with reaction being conducted at 50° C., the major product is bisdimethylaminodichlorotin.

EXAMPLE 9

When the procedure of Example 1 is used with 9 millimoles of tetramethyl germanate and 3 millimoles of tetrakisdimethylaminogermane as the reactants in 25 milliliters of toluene as the solvent, with reaction being conducted at 120° C., the major product is dimethylaminotrimethoxygermane. This product is characterized by NMR analysis as having two proton NMR peaks with shifts at −3.63 and −2.68 p.p.m. relative to tetramethylsilane.

EXAMPLE 10

When the procedure of Example 1 is used with 4 millimoles of tetramethylgermanate and 4 millimoles of tetrakisdimethylaminogermane as the reactants in 25 milliliters of toluene as the solvent, with reaction being conducted at 120° C., the major product is bisdimethylaminodimethoxygermane. This product is characterized by NMR analysis as having two proton NMR peaks with shifts at −3.55 and −2.65 p.p.m. relative to tetramethylsilane.

EXAMPLE 11

When the procedure of Example 1 is used with 3 millimoles of tetramethylgermanate and 9 millimoles of tetrakisdimethylaminogermane as the reactants in 25 milliliters of toluene as the solvent, with reaction being conducted at 120° C., the major product is trisdimethylaminomethoxygermane. This product is characterized by NMR analysis as having two proton NMR peaks with shifts at −3.52 and −2.63 p.p.m. relative to tetramethylsilane.

EXAMPLE 12

When the procedure of Example 1 is used with 5 millimoles of tetramethylmercaptotin and 15 millimoles of tin tetrachloride as the reactants in 25 milliliters of toluene as the solvent, with reaction being conducted at 150° C. the major product is methylmercaptotrichlorotin.

EXAMPLE 13

When the produce of Example 1 is used with 3 millimoles of tetramethylmercaptotin and 3 millimoles of tin tetrachloride as the reactants in 25 milliliters of toluene as the solvent, with reaction being conducted at 150° C., the major product is bismethylmercaptodichlorotin.

EXAMPLE 14

When the procedure of Example 1 is used with 2 millimoles of germanium tetraphenylacetylide and 6 millimoles of germanium tetrabromide as the reactants in 25 milliliters of benzene as the solvent, with reaction being conducted at 80° C., the major product is trichlorogermaniumphenylacetylide.

EXAMPLE 15

When the procure of Example 1 is used with 3 millimoles of tetracyanogermane and 1 millimole of germanium tetrabromide as the reactants in 30 milliliters of benzene as the solvent, with reaction being conducted at 100° C., the major product is tricyanobromogermane.

EXAMPLE 16

When the procedure of Example 1 is used with 2 millimoles of tetracyanogermane and 2 millimoles of germanium tetrachloride as the reactants in 30 milliliters of benzene as the solvent, with reaction being conducted at 100° C., the major product is dicyanodichlorogermane.

EXAMPLE 17

When the procedure of Example 1 is used with 3 millimoles of tetracyanatogermane and 3 millimoles of germanium tetrabromide as the reactants in 30 milliliters of benzene as the solvent, with reaction being conducted at 100° C., the major product is dicyanatodibromogermane.

EXAMPLE 18

When the procedure of Example 1 is used with 5 millimoles of tetracyanatogermane and 15 millimoles of tetramethylgermanate as the reactants in 40 milliliters of xylene as the solvent, with reaction being conducted at 150° C., the major product is trimethoxycyanatogermane.

EXAMPLE 19

When the procedure of Example 1 is used with 3 millimoles of tetracyanatogermane and 3 millimoles of tetramethylgermanate as the reactants in 50 milliliters of xylene as the solvent, with reaction being conducted at 150° C., the major product is dimethoxydicyanatogermane.

EXAMPLE 20

When the procedure of Example 1 is used with 2 millimoles of tetrathiocyanotin and 6 millimoles of tintetrabromide as the reactants in 50 milliliters of xylene as the solvent, with reaction being conducted at 150° C., the major product is thiocyanotribromotin.

EXAMPLE 21

When the procedure of Example 1 is used with 2 millimoles of tetrathiocyanotin and 2 millimoles of tin tetrabromide as the reactants in 50 milliliters of xylene as the solvent, with reaction being conducted at 150° C., the major product is dithiocyanodibromotin.

EXAMPLE 22

When the procedure of Example 1 is used with 3 millimoles of tetrathiocyanotin and 1 millimole of tin tetrabromide as the reactants in 50 milliliters of xylene as the solvent, with reaction being conducted at 150° C., the major product is trithiocyanobromotin.

EXAMPLE 23

When the procedure of Example 1 is used with 10 millimoles of methyltrichlorogermane and 5 millimoles of methyltribromogermane as the reactants in 50 milliliters of benzene as the solvent, with reaction being conducted at 75° C., the major product is methyldichlorobromogermane. This product is characterized by NMR analysis as having a proton NMR chemical shift of −1.742 p.p.m. relative to tetramethylsilane.

EXAMPLE 24

When the procedure of Example 1 is used with 5 millimoles of methyltrichlorogermane and 10 millimoles of methyltribromogermanes as the reactants in 50 milliliters of benzene as the solvent, with reaction being conducted at 75° C., the major product is methyldibromochlorogermane. This product is characterized by NMR analysis as having a proton NMR chemical shift of −1.875 p.p.m. relative to tetramethylsilane.

EXAMPLE 25

When the procedure of Example 1 is used with 10 millimoles of methyltrichlorogermane and 5 millimoles of methyltriiodogermane as the reactants in 50 milliliters of benzene as the solvent, with reaction being conducted at 75° C., the major product is methyldichloroiodogermane. This product is characterized by NMR analysis as having a proton NMR chemical shift of −1.977 p.p.m. relative to tetramethylsilane.

EXAMPLE 26

When the procedure of Example 1 is used with 5 millimoles of methyltrichlorogermane and 10 millimoles of methyltriiodogermane as the reactants in 50 milliliters of benzene as the solvent, with reaction being conducted at 75° C., the major product is methyldiiodochlorogermane. This product is characterized by NMR analysis as having a proton NMR chemical shift of −2.367 p.p.m. relative to tetramethylsilane.

EXAMPLE 27

When the procedure of Example 1 is used with 10 millimoles of methyltribromogermane and 5 millimoles of methyltriiodogermane as the reactants in 50 milliliters of benzene as the solvent, with reaction being conducted at 75° C., the major product is methyldibromoiodogermane. This product is characterized by NMR analysis as having a proton NMR chemical shift of −2.317 p.p.m. relative to tetramethylsilane.

EXAMPLE 28

When the procedure of Example 1 is used with 5 millimoles of methyltribromogermane and 10 millimoles of methyltriiodogermane as the reactants in 50 milliliters of benzene as the solvent, with reaction being conducted at 75° C., the major product is methyldiiodobromogermane. This product is characterized by NMR analysis as having a proton NMR chemical shift of −2.565 p.p.m. relative to tetramethylsilane.

EXAMPLE 29

When the procedure of Example 1 is used with 3 millimoles of methyltrimethylmercaptogermane and 6 millimoles of methyltricyanogermane as the reactants in 50 milliliters of xylene as the solvent, with reaction being conducted at 50° C., the major product is methyldicyanomethylmercaptogermane.

EXAMPLE 30

When the procedure of Example 1 is used with 6 millimoles of methyltrimethylmercaptogermane and 3 millimoles of methyltricyanogermane as the reactants in 50 milliliters of xylene as the solvent, with reaction being conducted at 10° C., the major product is methylcyanodimethylmercaptogermane.

EXAMPLE 31

When the procedure of Example 1 is used with 2 millimoles of methyltribromotin and 4 millimoles of methyltrimethylmercaptotin as the reactants in 50 milliliters of toluene as the solvent, with reaction being conducted at 150° C., the major product is methyldimethylmercaptobromotin.

EXAMPLE 32

When the procedure of Example 1 is used with 4 millimoles of methyltribromotin and 2 millimoles of methyltrimethylmercaptotin as the reactants in 50 milliliters of toluene as the solvent, with reaction being conducted at 150° C., the major product is methylmethylmercaptodibromotin.

EXAMPLE 33

When the procedure of Example 1 is used with 3 millimoles of phenyltrisdimethylaminotin and 6 millimoles of phenyltintribromide as the reactants in 50 milliliters of toluene as the solvent, with reaction being conducted at 25° C., the major product is phenyldibromodimethylaminotin.

EXAMPLE 34

When the procedure of Example 1 is used with 6 millimoles of phenyltrisdimethylaminotin and 3 millimoles of phenyltintribromide as the reactants in 50 milliliters of toluene as the solvent, with reaction being conducted at 25° C., the major product is phenylbromobisdimethylaminotin.

EXAMPLE 35

When the procedure of Example 1 is used with 2 millimoles of n-propyltricyanatogermane and 4 millimoles of n-propyltribromogermane as the reactants in 50 milliliters of toluene as the solvent, with reaction being conducted at 75° C., the major product is n-propyldibromocyanatogermane.

EXAMPLE 36

When the procedure of Example 1 is used with 4 millimoles of n-propyltricyanatogermane and 2 millimoles of n-propyltribromogermane as the reactants in 50 milliliters of xylene as the solvent, with reaction being conducted at 75° C., the major product is n-propyldicyanatobromogermane.

EXAMPLE 37

When the procedure of Example 1 is used with 5 millimoles of n-butyltintrichloride and 10 millimoles of n-butyltrimethoxytin as the reactants in 30 milliliters of xylene as the solvent, with reaction being conducted at 50° C., the major product is n-butylbistrimethoxychlorotin.

EXAMPLE 38

When the procedure of Example 1 is used with 10 millimoles of n-butyltintrichloride and 5 millimoles of n-butyltrimethoxytin as the reactants in 30 milliliters of xylene as the solvent, with reaction being conducted at 50° C., the major product is n-butyldichloromethoxytin.

EXAMPLE 39

When the procedure of Example 1 is used with 3 millimoles of n-octyltrisdimethylaminogermane and 6 millimoles of n-octyltrimethylmercaptogermane as the reactants in 25 milliliters of xylene as the solvent, with reaction being conducted at 150° C., the major product is n-octylbismethylmercaptodimethylaminogermane.

EXAMPLE 40

When the procedure of Example 1 is used with 6 millimoles of n-octyltrisdimethylaminogermane and 3 millimoles of n-octyltrimethylmercaptogermane as the reactants in 25 milliliters of xylene as the solvent, with reaction being conducted at 150° C., the major product is n-octylbisdimethylaminomethylmercaptogermane.

EXAMPLE 41

When the procedure of Example 1 is used with 2 millimoles of benzyltrichlorogermane and 4 millimoles of benzyltricyanogermane as the reactants in 25 milliliters of xylene as the solvent, with reaction being conducted at 50° C., the major product is benzyldicyanochlorogermane.

EXAMPLE 42

When the procedure of Example 1 is used with 4 millimoles of butyltrichlorogermane and 2 millimoles of benzyltricyanogermane as the reactants in 25 milliliters of xylene as the solvent, with reaction being conducted at 50° C., the major product is benzyldichlorocyanogermane.

EXAMPLE 43

When the procedure of Example 1 is used with 1.5 millimoles of cyclohexyltrifluorogermane and 3 millimoles of cyclohexyltristhiocyanogermane as the reactants in 25 milliliters of xylene as the solvent, with reaction being conducted at 75° C., the major product is cyclohexyldithiocyanofluorogermane.

EXAMPLE 44

When the procedure of Example 1 is used with 3 millimoles of cyclohexyltrifluorogermane and 1.5 millimoles of cyclohexyltrithiocyanogermane as the reactants in 25 milliliters of xylene as the solvent, with reaction being conducted at 75° C., the major product is cyclohexyldifluorothiocyanogermane.

EXAMPLE 45

When the procedure of Example 1 is used with 4 millimoles of n-butyltrismethylmercaptotin and 2 millimoles of n-butyltin trichloride as the reactants in 50 milliliters of benzene as the solvent, with reaction being conducted at 50° C., the major product is n-butylbismethylmercaptotin chloride.

EXAMPLE 46

When the procedure of Example 1 is used with 2 millimoles of n-butyltrismethylmercaptotin and 4 millimoles of n-butyltin trichloride as the reactants in 50 milliliters of benzene as the solvent, with reaction being conducted at 50° C., the major product is n-butyldichloromethylmercaptotin.

EXAMPLE 47

When the procedure of Example 1 is used with 3 millimoles of ethyltribromotin and 6 millimoles of ethyltriethoxytin as the reactants in 50 milliliters of benzene as the solvent, with reaction being conducted at 100° C., the major product is ethyldiethoxytin bromide.

EXAMPLE 48

When the procedure of Example 1 is used with 6 millimoles of ethyltribromotin and 2 millimoles of ethyltriethoxytin as the reactants in 50 milliliters of benzene as the solvent, with reaction being conducted at 100° C., the major product is ethyldibromoethoxytin.

EXAMPLE 49

When the procedure of Example 1 is used with 2 millimoles of phenyltriiodogermane and 4 millimoles of phenyltriacetyliodogermane as the reactants in 50 milliliters of hexane as the solvent, with reaction being conducted at 50° C., the major product is phenyldiacetyliododiodogermane.

EXAMPLE 50

When the procedure of Example 1 is used with 4 millimoles of phenyltriiodogermane and 2 millimoles of phenyltriacetyliodogermane as the reactants in 50 milliliters of hexane as the solvent, with reaction being conducted at 50° C., the major product is phenylacetyliododiiodogermane.

EXAMPLE 51

When the procedure of Example 1 is used with 5 millimoles of phenyltrifluorogermane and 10 millimoles of phenylgermanium triazide as the reactants in 50 milliliters of carbon tetrachloride as the solvent, with reaction being conducted at 25° C., the major product is phenylfluorogermanium diazide.

EXAMPLE 52

When the procedure of Example 1 is used with 10 millimoles of phenyltrifluorogermane and 5 millimoles of phenylgermanium triazide as the reactants in 50 milliliter of carbon tetrachloride as the solvent, with reaction being conducted at 25° C., the major product is phenyldifluorogermanium azide.

EXAMPLE 53

When the procedure of Example 1 is used with 2 millimoles of n-butyltrichlorotin and 4 millimoles of n-butyltrisdiethylaminotin as the reactants in 50 milliliters of hexane as the solvent, with reaction being conducted at 25° C., the major product is n-butylbisdiethylaminotin chloride.

EXAMPLE 54

When the procedure of Example 1 is used with 4 millimoles of n-butyltrichlorotin and 2 millimoles of n-butyltrisdiethylaminotin as the reactants in 50 milliliters of hexane as the solvent, with reaction being conducted at 25° C., the major product is n-butyldiethylaminotin dichloride.

EXAMPLE 55

When the procedure of Example 1 is used with 3 millimoles of n-butyltrimethylmercaptotin and 6 millimoles of n-butyltrimethoxytin as the reactants in 50 milliliters of benzene as the solvent, with reaction being conducted at 80° C., the major product is n-butylmethylmercaptodimethoxytin.

EXAMPLE 56

When the procedure of Example 1 is used with 6 millimoles of n-butyltrimethylmercaptotin and 3 millimoles of n-butyltrimethoxytin as the reactants in 50 milliliters of benzene as the solvent, with reaction being conducted at 80° C., the major product is n-butylbismethylmercaptomethoxytin.

EXAMPLE 57

When the procedure of Example 1 is used with 2 millimoles of n-propyltribromogermane and 4 millimoles of n-propyltristhiophenylgermane as the reactants in 100 milliliters of toluene as the solvent, with reaction being conducted at 120° C., the major product is n-propylbisthiophenylbromogermane.

EXAMPLE 58

When the procedure of Example 1 is used with 4 millimoles of n-propyltribromogermane and 2 millimoles of n-propyltrithiophenylgermane as the reactants in 100 milliliter of toluene as the solvent with reaction being conducted at 120° C., the major product is n-propyldibromothiophenylgermane.

EXAMPLE 59

When the procedure of Example 1 is used with 3 millimoles of n-decyltrichlorogermane and 6 millimoles of n-decyltriphenoxygermane as the reactants in 100 milliliters of toluene as the solvent, with reaction being conducted at 120° C., the major product is n-decyldiphenoxychlorogermane.

EXAMPLE 60

When the procedure of Example 1 is used with 6 millimoles of n-decyltrichlorogermane and 3 millimoles of n-decyltriphenoxygermane as the reactants in 100 milliliters of toluene as the solvent, with reaction being conducted at 120° C., the major product is n-decyldichlorophenoxygermane.

EXAMPLE 61

When the procedure of Example 1 is used with 2 millimoles of n-pentadecyltin tribromide and 4 millimoles of n-pentadecyltriphenoxytin as the reactants in 25 milliliters of toluene as the solvent, with reaction being conducted at 75° C., the major product is n-pentadecyldiphenoxytin chloride.

EXAMPLE 62

When the procedure of Example 1 is used with 4 millimoles of n-pentadecyltintribromide and 2 millimoles of n-pentadecyltriphenoxytin as the reactants in 25 milliliters of toluene as the solvent, with reaction being conducted at 75° C., the major product is n-pentadecyldibromophenoxytin.

EXAMPLE 63

When the procedure of Example 1 is used with 5 millimoles of n-octadecyltrifluorogermane and 10 millimoles of n-octadecyltrismethylphenylaminogermane as the reactants in 25 milliliters of toluene as the solvent, with reaction being conducted at 100° C., the major product is n - octadecylbismethylphenylaminofluorogermane.

EXAMPLE 64

When the procedure of Example 1 is used with 10 millimoles of n-octadecyltrifluorogermane and 5 millimoles of n-octadecyltrismethylphenylaminogermane as the reactants in 25 milliliters of toluene as the solvent, with reaction being conducted at 100° C., the major product is n - octadecylmethylphenylaminodifluorogermane.

EXAMPLE 65

When the procedure of Example 1 is used with 4 millimoles of p-chlorophenyltribromotin and 8 millimoles of p-chlorophenyltriphenoxytin as the reactants in 50 milliliters of hexane as the solvent, with reaction being conducted at 65° C., the major product is p-chlorophenylbisphenoxytinbromide.

EXAMPLE 66

When the procedure of Example 1 is used with 8 millimoles of p-chlorophenyltribromotin and 4 millimoles of p-chlorophenyltriphenoxytin as the reactants in 50 milliliters of hexane as the solvent, with reaction being conducted at 65° C., the major product is p-chlorophenylphenoxytin dibromide.

EXAMPLE 67

When the procedure of Example 1 is used with 3 millimoles of dimethyldichlorogermane and 3 millimoles of dimethyldibromogermane as the reactants in 25 milliliter of benzene as the solvent, with reaction being conducted at 50° C., the major product is dimethylchlorobromogermane. This product is characterized by NMR analysis as having a proton NMR chemical shift of —1.333 p.p.m. relative to tetramethylsilane.

EXAMPLE 68

When the procedure of Example 1 is used with 4 millimoles of dimethyldichlorogermane and 4 millimoles if dimethyldiiodogermane as the reactants in 25 milliliters of benzene as the solvent, with reaction being conducted at 50° C., the major product is dimethylchloroiodogermane. This product is characterized by NMR analysis as having a proton NMR chemical shift of —1.492 p.p.m. relative to tetramethylsilane.

EXAMPLE 69

When the procedure of Example 1 is used with 2 millimoles of dimethyldibromogermane and 2 millimoles of dimethyldiiodogermane as the reactants in 25 milliliters of benzene as the solvent, with reaction being conducted at 50° C., the major product is dimethylbromoiodogermane. This product is characterized by NMR analysis as having a proton NMR chemical shift of —1.733 p.p.m. relative to tetramethylsilane.

EXAMPLE 70

When the procedure of Example 1 is used with 2 millimoles of dimethyldichlorogermane and 2 millimoles of dimethyldicyanogermane as the reactants in 30 milliliters of benzene as the solvent, with reaction being conducted at 50° C., the major product is dimethylchlorocyanogermane. This product is characterized by NMR analysis as having a proton NMR chemical shift of —0.660 p.p.m. relative to tetramethylsilane.

EXAMPLE 71

When the procedure of Example 1 is used with 3 millimoles of dimethyldibromogermane and 3 millimoles of dimethyldicyanogermane as the reactants in 30 milliliters of benzene as the solvent, with reaction being conducted at 50° C., the major product is dimethylbromocyanogermane. This product is characterized by NMR analysis as having a proton NMR chemical shift of —0.607 p.p.m. relative to tetramethylsilane.

EXAMPLE 72

When the procedure of Example 1 is used with 4 millimoles of dimethyldichlorogermane and 4 millimoles of dimethyldimethoxygermane as the reactants in 25 milliliters of hexane as the solvent, with reaction being conducted at 50° C., the major product is dimethylmethoxychlorogermane. This product is characterized by NMR analysis as having proton NMR chemical shifts of —0.737 and —3.418 p.p.m. relative to tetramethylsilane.

EXAMPLE 73

When the procedure of Example 1 is used with 3 millimoles of dimethyldibromogermane and 3 millimoles of dimethyldimethoxygermane as the reactants in 25 milliliters of chloroform as the solvent, with reaction being conducted at 50° C., the major product is dimethylmethoxybromogermane. This product is characterized by NMR analysis as having proton NMR chemical shifts of —0.935 and —3.418 p.p.m. relative to tetramethylsilane.

EXAMPLE 74

When the procedure of Example 1 is used with 3 millimoles of dimethyldiiodogermane and 3 millimoles of dimethyldimethoxygermane as the reactants in 25 milliliters of chloroform as the solvent, with reaction being conducted at 50° C., the major product is dimethylmethoxyiodogermane. This product is characterized by NMR chemical shifts of —1.186 and —3.482 p.p.m. relative to tetramethylsilane.

EXAMPLE 75

When the procedure of Example 1 is used with 2 millimoles of dimethyldichlorogermane and 2 millimoles of dimethylbismethylmercaptogermane as the reactants in 50 milliliters of chloroform as the solvent, with reaction being conducted at 60° C., the major product is dimethylmethylmercaptochlorogermane. This product is characterized by NMR analysis as having proton NMR chemical shifts of —0.935 and —2.157 p.p.m. relative to tetramethylsilane.

EXAMPLE 76

When the procedure of Example 1 is used with 3 millimoles of dimethyldibromogermane and 3 millimoles of dimethylbismethylmercaptogermane as the reactants in 50 milliliters of chloroform as the solvent, with reaction being conducted at 60° C., the major product is dimethylmethylmercaptobromogermane. This product is characterized by NMR analysis as having a proton NMR chemical shift of —1.092 and —2.143 p.p.m. relative to tetramethylsilane.

EXAMPLE 77

When the procedure of Example 1 is used with 2 millimoles of dimethyldiiodogermane and 2 millimoles of dimethylbismethylmercaptogermane as the reactants in 50 milliliters of chloroform as the solvent, with reaction being conducted at 60° C., the major product is dimethylmethylmercaptoiodogermane. This product is characterized by NMR chemical shifts of —1.279 and —2.100 p.p.m. relative to tetramethylsilane.

EXAMPLE 78

When the procedure of Example 1 is used with 3 millimoles of dimethyldimethoxygermane and 3 millimoles of dimethylbismethylmercaptogermane as the reactants in 50 milliliters of xylene as the solvent, with reaction being conducted at 120° C., the major product is dimethylmethylmercaptomethoxygermane. This product is characterized by NMR analysis as having proton NMR chemical shifts of —0.583 and —3.438 and —2.022 p.p.m. relative to tetramethylsilane.

EXAMPLE 79

When the procedure of Example 1 is used with 4 millimoles of diethyldichlorogermane and 4 millimoles of diethylbisdiethylaminogermane as the reactants in 50 milliliters of xylene as the solvent, with reaction being conducted at 25° C., the major product is diethyldiethylaminochlorogermane.

EXAMPLE 80

When the procedure of Example 1 is used with 2 millimoles of diphenyldicyanogermane and 2 millimoles of diphenyldicyanatogermane as the reactants in 50 milliliters of xylene as the solvent, with reaction being conducted at 100° C., the major product is diphenylcyanocyanatogermane.

EXAMPLE 81

When the procedure of Example 1 is used with 3 millimoles of dibutyldichlorotin and 3 millimoles of dibutyldiphenoxytin as the reactants in 25 milliliters of xylene as the solvent, with reaction being conducted at 100° C., the major product is dibutylphenoxytinchloride.

EXAMPLE 82

When the procedure of Example 1 is used with 2 millimoles of diphenylidibromotin and 2 millimoles of diphenyldithiophenyltin as the reactants in 25 milliliters of xylene as the solvent, with reaction being conducted at 100° C., the major product is diphenylthiophenyltinbromide.

EXAMPLE 83

When the procedure of Example 1 is used with 4 millimoles of dibenzyltindichloride and 4 millimoles of dibenzyltindicyanide as the reactants in 25 milliliters of xylene as the solvent, with reaction being conducted at 25° C., the major product is dibenzylcyanotinchloride.

The present mixed compounds have utility in a variety of industrial applications, for example, as functional fluids, e.g., for the transmission of pressure in hydraulic systems. The present compound also have utility as dielectric materials, for example in condensers or transformers.

The tin compounds are generally characterized by biological activity such as in the form of insecticidal compositions.

The compounds of the invention are also useful as additives to polymers such as polyvinyl chloride for example to provide plasticizing action, for example, by the use of dibutyltin compounds having as the other moiety of the mixed compositions various other ligands such as chloro and other halogen groups, phenoxy, methoxy and other alkoxyl and aroxyl groups. The various mixed compounds of tin or germanium are also of utility as intermediates.

What is claimed is:

1. Mixed organometallic compounds having the general formula $$R_{4-n}MX_{n-m}Y_m$$

in which R is selected from the group consisting of hydrocarbyl radicals having from 1 to 20 carbon atoms; M is a metal selected from the group consisting of germanium and tin; X and Y are different components with X being selected from the group consisting of an alkoxyl, thioalkyl, dialkylamino, cyano, cyanate, thiocyanate, azide, and acetylide; and Y being selected from the group consisting of dialkylamino, cyano, cyanate, thiocyanate, azide, and acetylide; $n$ is a whole number from 2 to 4, and $m$ is a whole number from 1 to 3, with the requirement that $m$ be less than $n$.

2. Mixed organometallic compounds having the general formula $$R_{4-n}GeX_{n-m}Y_m$$

in which R is selected from the group consisting of hydrocarbyl radicals having from 1 to 20 carbon atoms; X and Y are different components with X being selected from the group consisting of alkoxyl, thioalkyl, dialkylamino, cyano, cyanate, thiocyanate, azide and acetylide; and Y being selected from the group consisting of dialkylamino, cyano, cyanate, thiocyanate, azide and acetylide; $n$ is a whole number from 2 to 4, and $m$ is a whole number from 1 to 3, with the requirement that $m$ be less than $n$.

3. Mixed organometallic compounds having the general formula $$R_{4-n}SnX_{n-m}Y_m$$

in which R is selected from the group consisting of hydrocarbyl radicals having from 1 to 20 carbon atoms; X and Y are different components with X being selected from the group consisting of an alkoxyl, thioalkyl, dialkylamino, cyano, cyanate, thiocyanate, azide and acetylide; and Y being selected from the group consisting of dialkylamino, cyano, cyanate, thiocyanate, azide and acetylide; $n$ is a whole number from 2 to 4, and $m$ is a whole number from 1 to 3, with the requirement that $m$ be less than $n$.

4. Process for the preparation of mixed organometallic compounds having the general formula $$R_{4-n}MX_{n-m}Y_m$$

in which R is selected from the group consisting of hydrocarbyl radicals having from 1 to 20 carbon atoms; M is a metal selected from the group consisting of germanium and tin; X and Y are different components selected from the group consisting of a halogen, alkoxyl, thioalkyl, dialkylamino, cyano, cyanate, thiocyanate, azide, and acetylide; $n$ is a whole number from 2 to 4, and $m$ is a whole number from 1 to 3, with the requirement that $m$ be less than $n$, which comprises mixing and reacting $R_{4-n}MX_n$ and $R_{4-n}MY_n$ in the mol proportion of 1:0.05 to 1:50 at a temperature of $-20°$ C. to $300°$ C.

5. Process for the preparation of mixed organometallic compounds having the general formula $$R_{4-n}GeX_{n-m}Y_m$$

in which R is selected from the group consisting of hydrocarbyl radicals having from 1 to 20 carbon atoms; X and Y are different components selected from the group consisting of halogen, alkoxyl, thioalkyl, dialkylamino, cyano, cyanate, thiocyanate, azide, and acetylide; $n$ is a whole number from 2 to 4, and $m$ is a whole number from 1 to 3, with the requirement that $m$ be less than $n$, which comprises mixing and reacting $R_{4-n}GeX_n$ and $R_{4-n}GeY_n$ in the mol proportions of 1:0.05 to 1:50 at a temperature of $-20°$ C. to $300°$ C.

6. Process for the preparation of mixed organometallic compounds having the general formula $$R_{4-n}SnX_{n-m}Y_m$$

in which R is selected from the group consisting of hydrocarbyl radicals having from 1 to 20 carbon atoms; X and Y are different components selected from the group consisting of halogen, alkoxyl, thioalkyl, dialkylamino, cyano, cyanate, thiocyanate, azide and acetylide; $n$ is a whole number from 2 to 4, and $m$ is a whole number from 1 to 3, with the requirement that $m$ be less than $n$, which comprises mixing and reacting $R_{4-n}SnX_n$ and $R_{4-n}SnY_n$ in the mol proportions of 1:0.05 to 1:50 at a temperature of $-20°$ C.

7. The compound $Cl_3Sn(SCH_3)$.
8. The compound $Cl_2Sn[N(CH_3)_2]_2$.
9. The compound $BrSn(SCN)_3$.
10. The compound $Ge(OCH_3)[N(CH_3)_2]_3$.
11. The compound $Ge(OCH_3)_2[N(CH_3)_2]_2$.
12. The compound $Ge(OCH_3)_3[N(CH_3)_2]$.
13. The compound $CH_3GeCl_2(SCH_3)$.
14. The compound $CH_3GeCl(SCH_3)_2$.
15. The compound $n\text{-}C_4H_9SnCl[N(C_2H_5)_2]_2$.
16. The compound $n\text{-}C_4H_9SnCl_2[N(C_2H_5)_2]$.
17. The compound $(CH_3)_2GeCl(SCH_3)$.
18. The compound $(CH_3)_2GeBr(CN)$.
19. The compound $(CH_3)_2SnClCN$.

20. Process for the preparation of mixed organometallic compound having the general formula $$R_{4-n}MX_{n-m}Y_m$$

in which R is selected from the group consisting of hydrocarbyl radicals having from 1 to 20 carbon atoms; M is a metal selected from the group consisting of germanium and tin; X and Y are different components with X being selected from the group consisting of a halogen, alkoxyl, thioalkyl, dialkylamino, cyano cyanate, thiocyanate, azide, and acetylide; and Y being selected from the group consisting of dialkylamino, cyano, cyanate, thiocyanate, azide, and acetylide; $n$ is a whole number from 2 to 4, and $m$ is a whole number from 1 to 3, with the requirement that $m$ be less than $n$, which comprises mixing and reacting $R_{4-n}MX_n$ and $R_{4n-}MY_n$ in the mol proportions of 1:0.05 to 1:50 at a temperature of $-20°$ C. to $300°$ C.

21. Process for the preparation of mixed organometallic compounds having the general formula $$R_{4-n}GeX_{n-m}Y_m$$

in which R is selected from the group consisting of hydrocarbyl radicals having from 1 to 20 carbon atoms; X and Y are different components with X being selected from the group consisting of halogen, alkoxyl, thioalkyl, dialkylamino, cyano, cyanate, thiocyanate, azide and acetylide; $n$ is a whole number from 2 to 4, and $m$ is a whole number from 1 to 3 with the requirement that $m$ be less than $n$, which comprises mixing and reacting $R_{4-n}GeX_n$ and $R_{4-n}GeY_n$ in the mol proportions of 1:0.05 to 1:50 at a temperature of $-20°$ C. to $300°$ C.

22. Process for the preparation of mixed organometallic compounds having the general formula $$R_{4-n}SnX_{n-m}Y_m$$

in which R is selected from the group consisting of hydrocarbyl radicals having from 1 to 20 carbon atoms; X and Y are different components with X being selected from the group consisting of a halogen, alkoxyl, thioalkyl, dialkylamino, cyano, cyanate, thiocyanate, azide, and acetylide; $n$ is a whole number from 2 to 4, and $m$ is a whole number from 1 to 3, with the requirement that $m$ be less than $n$, which comprises mixing and reacting $R_{4-n}SnX_n$ and $R_{4-n}SnY_n$ in the mol proportions of 1:0.05 to 1:50 at a temperature of $-20°$ C. to $300°$ C.

References Cited
UNITED STATES PATENTS

| | | | |
|---|---|---|---|
| 2,914,506 | 11/1959 | Mack et al. | 260—45.75 |
| 3,206,488 | 9/1965 | Stamm. | |
| 3,311,646 | 3/1967 | Washburn et al. | 260—429 |
| 3,232,958 | 2/1966 | Washburn | 260—349 |

OTHER REFERENCES

Pike et al.: Rec. Trav. Chim., vol. 81 (1962), pp. 475–9.

Johnson et al.: J. Am Chem, Soc., vol. 77 (1955), pp. 5857–8.

Yakubovich et al.: Zhur. Obshchei Khim. 28 (1958), pp. 1036–8; also Chem. Abst. 52 (1958), col. 17094a.

Anderson et al.: J. Am. Chem. Soc, vol. 73 (1951), pp. 5804–5.

Van Wazer et al.: J. Inorg. Nucl. Chem., vol. 26 (1964), pp. 737–744.

Venkateswath et al.: Chem. Abst., vol. 51 (1957), col. 11068a.

Vyazankin et al.: Chem. Abst., vol. 60 (1964), col. 12040d.

Rochow et al.: The Chemistry or Organometallic Compounds, John Wiley & Sons, New York, N.Y., 1957, p. 62.

TOBIAS E. LEVOW, Primary Examiner

U.S. Cl. X.R.

23—50, 53, 87, 98; 252—63.5 71. 74; 260—29.1, 33.8, 349, 429.7, 999

PO-1050
(5/69)

UNITED STATES PATENT OFFICE
CERTIFICATE OF CORRECTION

Patent No. 3,470,220    Dated Sept. 30, 1969

Inventor(s) Kurt Moedritzer et al

It is certified that error appears in the above-identified patent and that said Letters Patent are hereby corrected as shown below:

Column 1, line 72, the formula "$GeCl_2(C\ CF)_2$" should read -- $GeCl_2(C\ CR)_2$ --, Column 4, line 52, "of tin tetrachloride and 2 millimoles" should read -- of tin tetrachloride and 3 millimoles.--

Column 5, line 37, "When the procure of Example 1" should read -- When the procedure of Example 1 --.

Column 11, line 69, after "is characterized by NMR" insert -- analysis as having proton NMR --.

Column 12, line 26, after "characterized by NMR" insert -- analysis as having proton NMR --.

Column 14, line 25, after "of -20°C" insert -- to 300°C

Column 14, line 38, in the formula "$(CH_3)_2SnClCN)$" should read -- $(CH_3)_2SnCl(CN)$ --.

Column 14, line 55, the formula "$R_{4n-}MY_n$" should read -- $R_{4-n}MY_n$ --.

Column 14, line 66, after "azide and acetylide;" insert -- and y being selected from the group consisting of dialkylamino, cyano, cyanate, thiocyanate, azide and acetylide --.

Column 15, line 6, after "azide, and acetylide;" insert -- and Y being selected from the group consisting of dialkylamino, cyano, cyanate, thiocyanate, azide and acetylide --.

SIGNED AND
SEALED

JUN 16 1970

(SEAL)
Attest:

Edward M. Fletcher, Jr.
Attesting Officer

WILLIAM E. SCHUYLER, J
Commissioner of Patent

PO-1050
(5/69)

UNITED STATES PATENT OFFICE
CERTIFICATE OF CORRECTION

Patent No. 3,470,220          Dated Sept. 30, 1969

Inventor(s) Kurt Moedritzer et al

It is certified that error appears in the above-identified patent and that said Letters Patent are hereby corrected as shown below:

Column 1, line 72, the formula "$GeCl_2(C\ CF)_2$" should read -- $GeCl_2(C\ CR)_2$ --, Column 4, line 52, "of tin tetrachloride and 2 millimoles" should read -- of tin tetrachloride and 3 millimoles.--

Column 5, line 37, "When the procure of Example 1" should read -- When the procedure of Example 1 --.

Column 11, line 69, after "is characterized by NMR" insert -- analysis as having proton NMR --.

Column 12, line 26, after "characterized by NMR" insert -- analysis as having proton NMR --.

Column 14, line 25, after "of -20°C" insert -- to 300°C

Column 14, line 38, in the formula "$(CH_3)_2SnClCN)$" should read -- $(CH_3)_2SnCl(CN)$ --.

Column 14, line 55, the formula "$R_{4n-}MY_n$" should read -- $R_{4-n}MY_n$ --.

Column 14, line 66, after "azide and acetylide;" insert -- and y being selected from the group consisting of dialkylamino, cyano, cyanate, thiocyanate, azide and acetylide --.

Column 15, line 6, after "azide, and acetylide;" insert -- and Y being selected from the group consisting of dialkylamino, cyano, cyanate, thiocyanate, azide and acetylide --.

SIGNED AND
SEALED

JUN 16 1970

(SEAL)
Attest:

Edward M. Fletcher, Jr.
Attesting Officer

WILLIAM E. SCHUYLER, JR
Commissioner of Patents